United States Patent
Hunt et al.

(10) Patent No.: US 6,279,549 B1
(45) Date of Patent: *Aug. 28, 2001

(54) HEATER FOR A COLD START FUEL INJECTOR

(75) Inventors: Frank W. Hunt, White Lake; Shigeru Oho, Farmington Hills, both of MI (US)

(73) Assignee: Hitachi America, Ltd., Tarrytown, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/590,729

(22) Filed: Jun. 8, 2000

Related U.S. Application Data

(63) Continuation-in-part of application No. 09/399,846, filed on Sep. 21, 1999, now Pat. No. 6,109,247.

(51) Int. Cl.[7] .................................................. F02M 31/125
(52) U.S. Cl. ............................................................ 123/549
(58) Field of Search ....................................... 123/549, 557

(56) References Cited

U.S. PATENT DOCUMENTS

| | | | |
|---|---|---|---|
| 4,366,798 | 1/1983 | Goto et al. | 123/549 |
| 4,395,994 | 8/1983 | Goto et al. | 123/549 |
| 4,407,254 | 10/1983 | Kato et al. | 123/549 |
| 4,870,249 | 9/1989 | Kayanuma et al. | . |
| 5,054,459 | 10/1991 | Reimer et al. | 123/549 |
| 5,086,747 | 2/1992 | Curhan | 123/549 |
| 5,134,986 | 8/1992 | Curhan | 123/549 |
| 5,297,530 * | 3/1994 | Kaneko et al. | 123/549 |
| 5,465,701 | 11/1995 | Hunt . | |
| 5,482,023 | 1/1996 | Hunt et al. | 123/491 |
| 5,529,035 | 6/1996 | Hunt et al. | 123/179.15 |
| 5,598,826 | 2/1997 | Hunt et al. | . |
| 5,894,832 | 4/1999 | Nogi et al. | . |
| 5,924,411 * | 7/1999 | Guettle et al. | 123/549 |
| 6,053,153 * | 4/2000 | Moser et al. | 123/549 |
| 6,067,970 * | 5/2000 | Awarzamani et al. | 123/549 |

* cited by examiner

Primary Examiner—Marguerite McMahon
(74) Attorney, Agent, or Firm—Gifford, Krass, Groh, Sprinkle, Anderson & Citkowski, P.C.

(57) ABSTRACT

A heater is provided for use in conjunction with a fuel passageway, such as a cold start passageway, in an internal combustion engine in which fuel is injected into the passageway. The heater includes a tubular housing which is insertable into the passageway so that fuel flow through the passageway flows through the interior of the housing. A plurality of heater assemblies are also provided wherein each heating assembly has a capsule and at least one electrical heating element thermally coupled to its associated capsule. The capsules are secured to the housing so that the capsules are circumferentially spaced from each other around the housing. In one embodiment, the capsules are secured to an interior surface of the housing so that one surface of each capsule is open to the passageway. In a second embodiment, the capsules are secured around the outer periphery of the housing and each heating element is thermally connected to the housing.

23 Claims, 7 Drawing Sheets

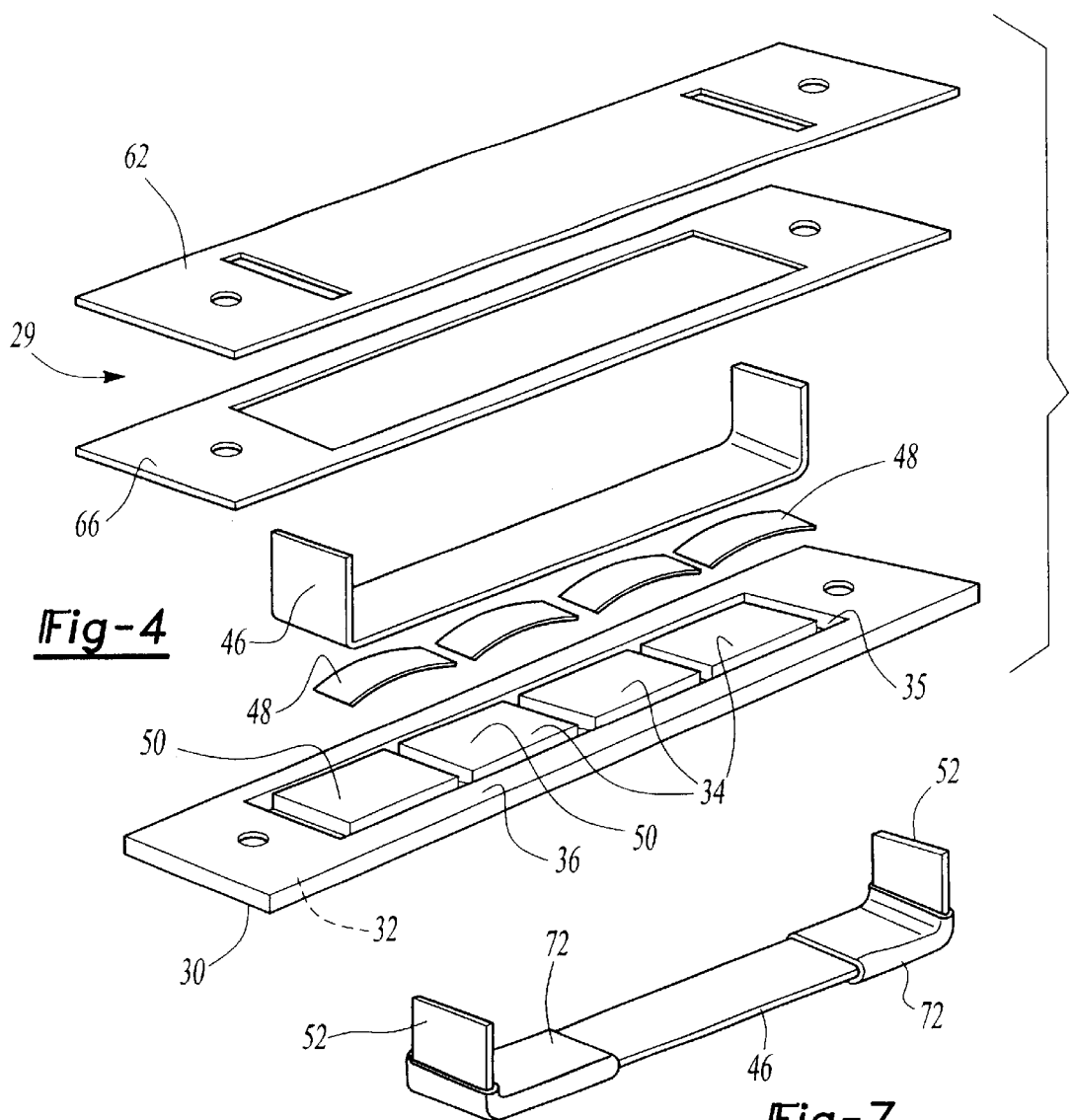
*Fig-4*
*Fig-7*
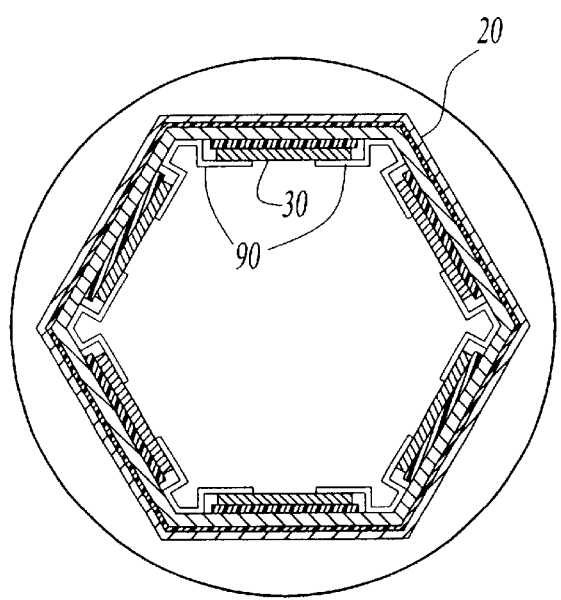
*Fig-9*

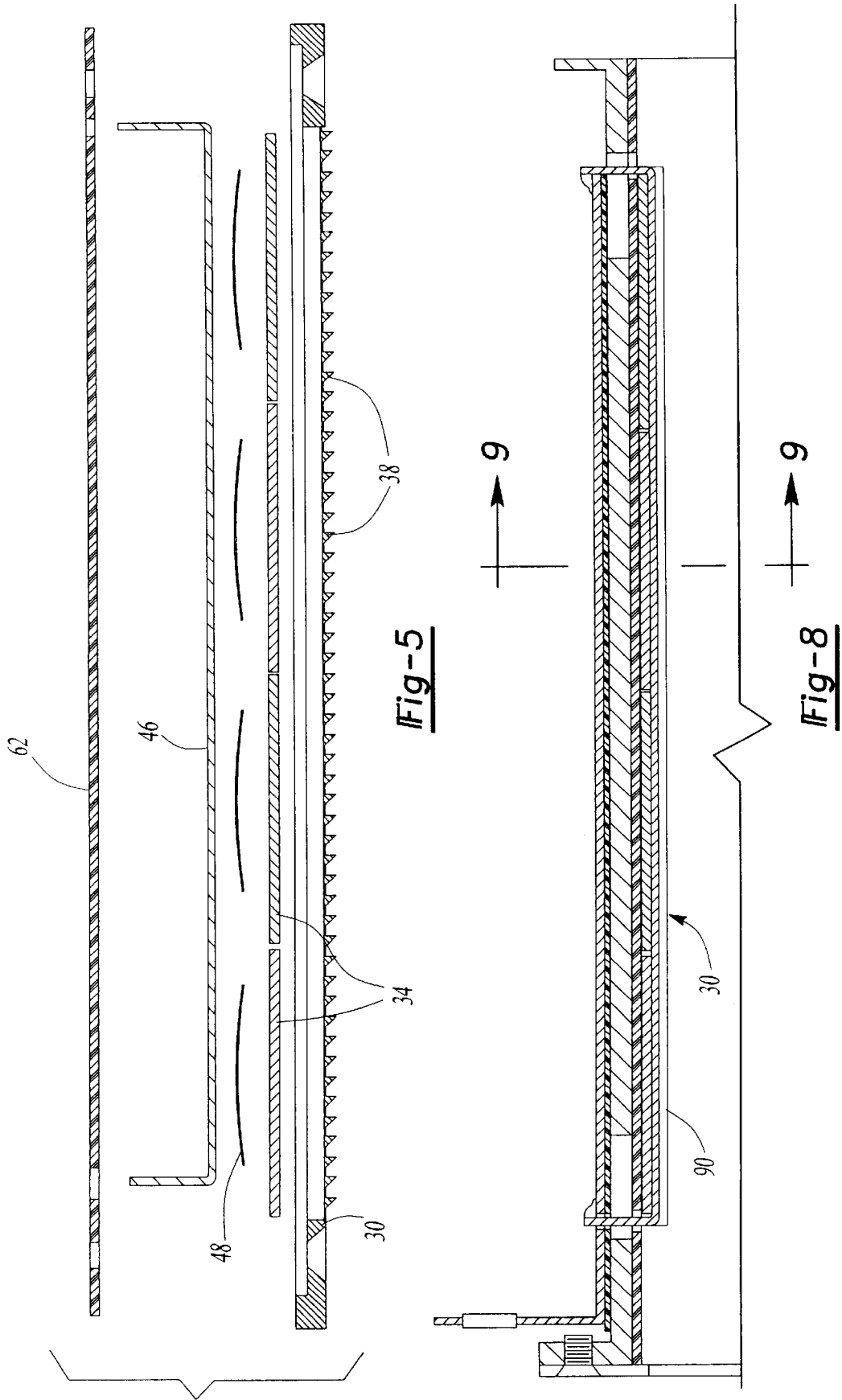

HEATER FOR A COLD START FUEL INJECTOR

CROSS REFERENCE TO RELATED APPLICATIONS

This application is a continuation-in-part of patent application Ser. No. 09/399,846, filed Sep. 21, 1999, entitled "Heater for a Cold Start Fuel Injector" now U.S. Pat. No. 6,109,247.

BACKGROUND OF THE INVENTION

I. Field of the Invention

The present invention relates to a heater for a cold start fuel injector for an internal combustion engine.

II. Description of the Prior Art

Governmental regulations restrict the maximum amount of hydrocarbon emissions as well as other emissions from an internal combustion engine. The most critical factor, however, affecting hydrocarbon emissions from an internal combustion engine occurs during the "cold start" phase of the engine start up. During the cold start phase, typically two minutes after engine ignition, the catalytic converter typically used in automotive vehicles is cold and, additionally, fuel enrichment is used to insure engine ignition. As such, during a cold start of the engine, the air/fuel ratio is much richer than stoichiometric combustion, typically 10–14:1. Furthermore, up to 50% of the hydrocarbon emissions permitted by government regulations can occur during the first 20 seconds following engine ignition.

In order to reduce hydrocarbon emissions, it is desirable to start the engine in a stoichiometric or lean state with an air/fuel ratio in the range of 14.5–16.1 depending upon the engine cylinder design and fuel composition. The spark timing is also typically retarded in order to effectively transfer heat from the combustion chamber to the catalyst in order to more quickly warm up the catalyst in the catalytic converter.

In order to provide a leaner fuel mixture during the cold start phase following engine ignition, there have been a number of previously known devices associated with cold start fuel injectors to vaporize the fuel from the cold start fuel injector prior to its induction into the engine cylinder. Vaporization of the fuel from the cold start fuel injector, of course, enables a leaner air/fuel mixture to be inducted into the engine cylinders while still insuring engine ignition during a cold start condition. However, these previously known heaters have not proven wholly satisfactory in operation.

SUMMARY OF THE PRESENT INVENTION

The present invention provides a heater for use with a fuel passageway for an internal combustion engine, such as a cold start fuel passageway, which overcomes the above-mentioned disadvantages of the previously known devices.

In brief, the heater of the present invention comprises a tubular housing which is insertable into the passageway. The tubular housing is inserted into the passageway so that fuel flow through the passageway flows through the interior of the tubular housing.

The heater of the present invention further comprises a plurality of heating assemblies wherein each heating assembly includes a capsule and at least one electrical heating element thermally coupled to its associated capsule. In the preferred embodiment of the invention, the heating element comprises a PTC ceramic material although other materials may optionally be used.

The capsules are then secured to the housing so that the capsules are circumferentially spaced from each other around the housing. In one embodiment, the capsules are secured to an interior surface of the tubular housing so that at least one surface of the capsule is open to the interior of the tubular housing. Thus, upon activation of the heating elements, the heating elements heat the surface of the capsule exposed to the interior of the tubular housing thus heating and vaporizing any fuel flow through the tubular housing.

In a further embodiment of the invention, the capsules are secured around the outer periphery of the housing so that the capsules are circumferentially spaced from each other. In this embodiment of the invention, one surface of each heating element is thermally coupled to the housing. Consequently, upon activation or energization of the heating elements, the heating elements heat the housing thus heating and vaporizing any fuel flow through the housing.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which:

FIG. 4 is an exploded view illustrating a preferred embodiment of one heating assembly of the present invention;

FIG. 5 is an exploded view illustrating one heating assembly of the present invention;

FIG. 7 is a perspective view illustrating a modification of the insulating means for one electrode of the present invention;

FIG. 8 is a longitudinal sectional view illustrating a modified mounting means for one heating element of the present invention;

FIG. 9 is a sectional view taken substantially along line 9—9 in FIG. 8;

DETAILED DESCRIPTION OF PREFERRED EMBODIMENTS OF THE PRESENT INVENTION

Figure 1:
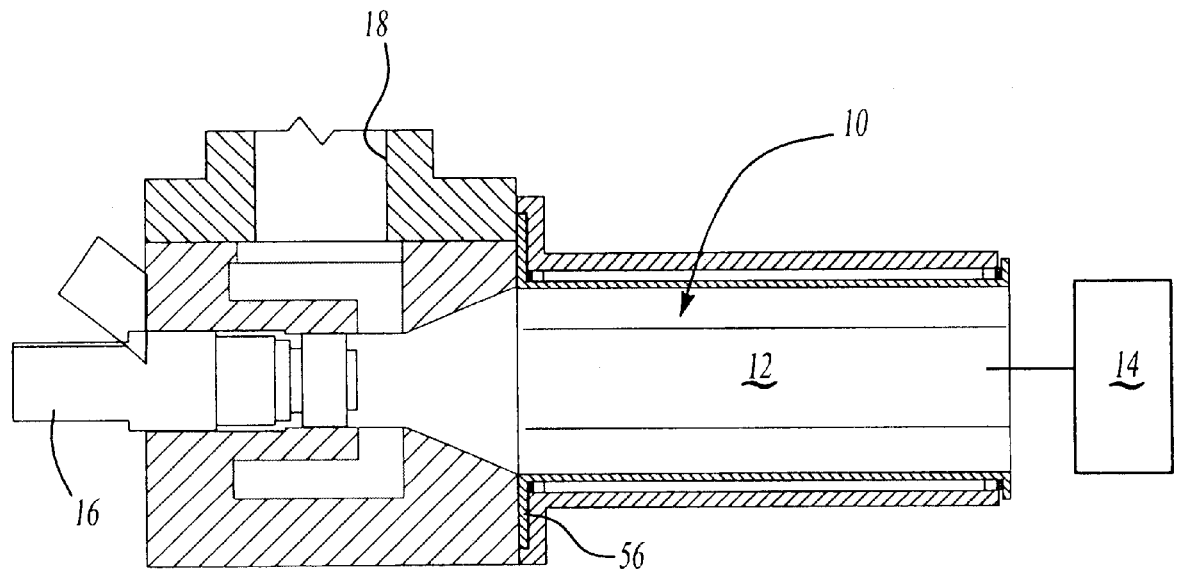
FIG. 1 is a side diagrammatic view illustrating a preferred embodiment of the present invention for use with a cold start fuel injector.

With reference first to FIG. 1, a first preferred embodiment of the heater 10 of the present invention is there shown for use with a fuel passageway 12, such as a cold start fuel injector passageway, of an internal combustion engine 14 (illustrated only diagrammatically). In the conventional fashion a cold start fuel injector 16 injects fuel into the passageway 12 upon activation. The passageway 12, in turn, is fluidly connected with the intake manifold of the internal combustion engine 14. In the conventional fashion, auxiliary air is typically introduced through a port 18 so that the auxiliary air mixes with the fuel from the injector 16 prior to its induction into the combustion chambers of the engine 14.

As will be shortly described in greater detail, the heater 10 is insertable into the cold start fuel injector passageway 12 of the engine 14 to not only heat the fuel, but also vaporize any fuel droplets which may be contained in the injected fuel. Such vaporization of the fuel provides for more efficient engine combustion, as well as a faster and more rapid engine startup. However, even though the heater 10 will be described for use in conjunction with a cold start fuel passageway 12, it will be understood that the heater 10 may alternatively be used in other fuel passageways for internal combustion engines.

Figure 3:
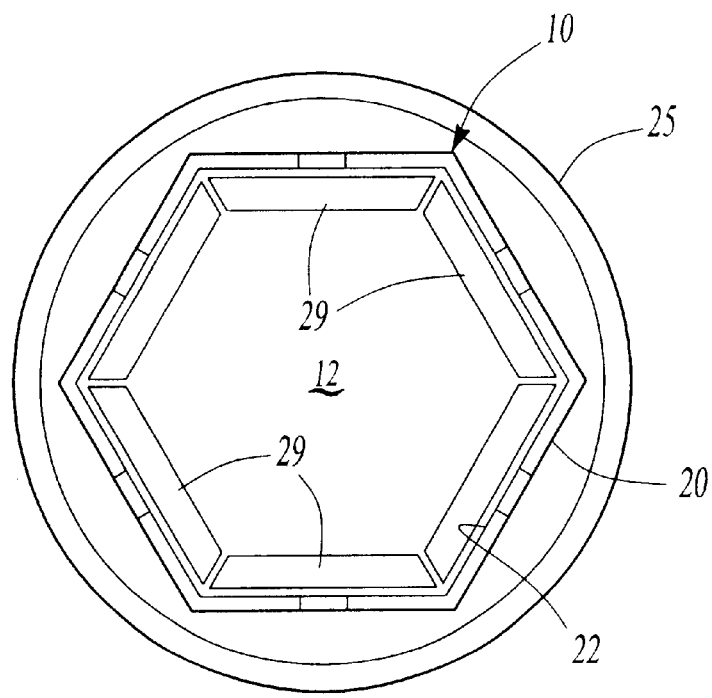
FIG. 3 is a sectional view taken substantially along line 3—3 in FIG. 2.
Figure 2:
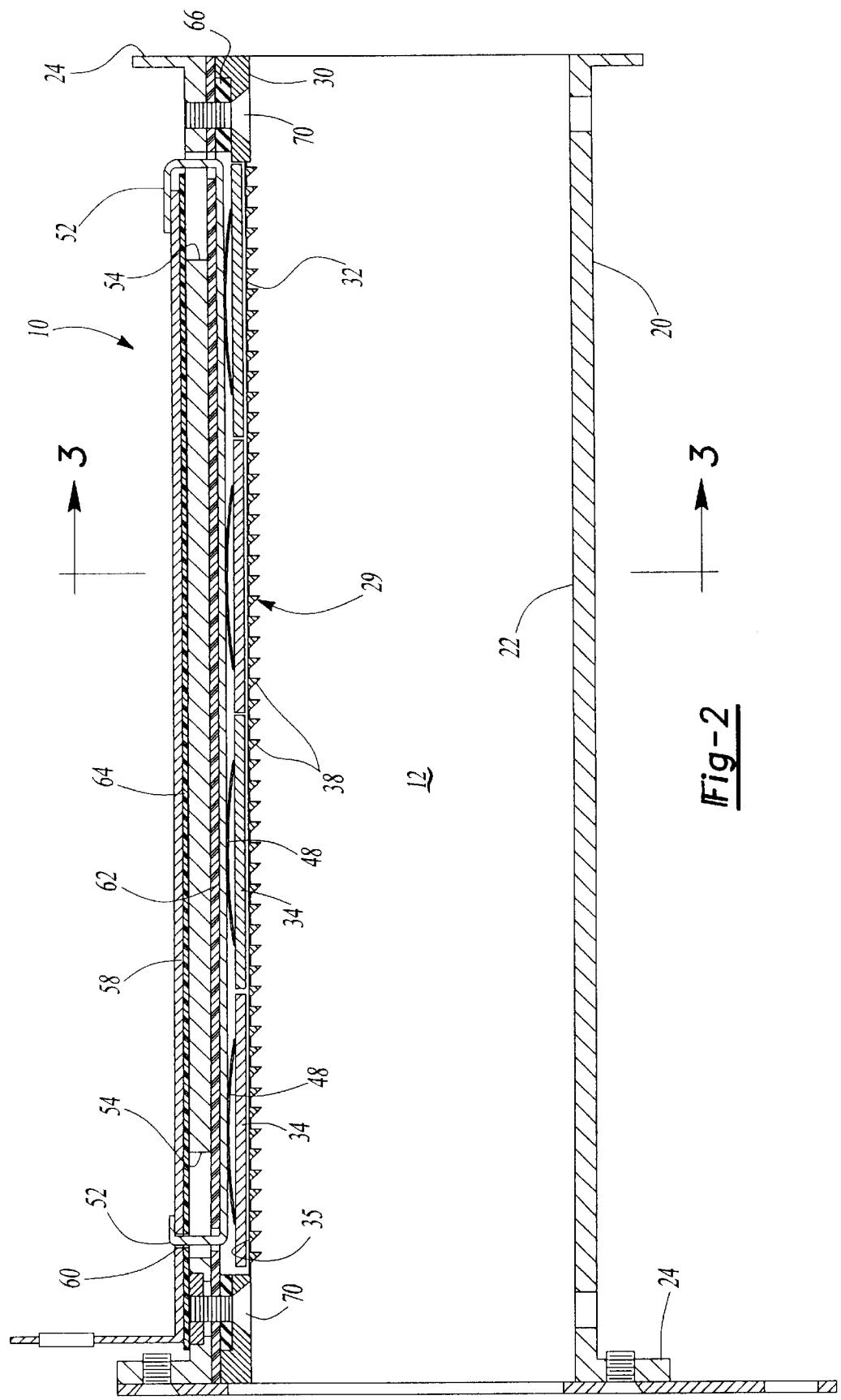
FIG. 2 is a longitudinal sectional view of a first preferred embodiment of the present invention and with parts removed for clarity.

With reference then to FIGS. 2–3, a first preferred embodiment of the heater 10 of the present invention is there shown and comprises a tubular and cylindrical housing 20 which is preferably constructed of metal although other materials may alternatively be used. The housing 20 is preferably formed into a polygonal, and preferably hexagonal, shape such that an interior 22 of the housing 20 is coaxially aligned with the fuel passageway 12.

As best shown in FIG. 2, the housing 20 includes an outwardly extending annular flange 24 at each end. An outer periphery of each flange 24 is dimensioned to abut against the interior of the fuel passageway housing 25 (FIG. 3) thus effectively sealing the ends of the housing 20 to the fuel passageway housing 25. These flanges 24 thus serve two purposes. First, the flanges 24 serve to mount the housing 20 within the passageway 12 such that the housing 20 is coaxially aligned with the fuel passageway 12. Secondly, the flanges 24 effectively seal the housing 20 to the passageway housing 25 thus forcing all fuel flow from the injector 16 to flow through the interior of the housing 20 as well as any introduced air through the port 18.

With reference now to FIGS. 2–4, the heater 10 of the present invention further comprises a plurality of heating assemblies 29, each of which is substantially identical to the other. As such, only a single heating assembly 29 will be described in detail, it being understood that a like description shall also apply to the other heating assemblies.

As best shown in FIGS. 2, 4 and 5, the heating assembly 29 generally comprises an elongated capsule 30 which is preferably constructed of metal, such as aluminum. The capsule 30 is dimensioned so that with the capsule 30 attached to the interior surface 22 of the housing 20 (FIG. 2), one side 32 of each capsule 30 is open to the fuel passageway 12. The capsule 30 is also preferably dimensioned so that it extends substantially the entire length of the passageway 12.

At least one, and preferably several heating elements 34 are mounted and preferably secured to a recessed channel 35 formed in the other side 36 of the capsule 30 by any conventional means, such as soldering or gluing. In doing so, one side of each heating element 34 is thermally coupled with the channel 35 of the capsule 30. Thus, upon activation of the heating elements 34, the heating elements 34 heat the surface 32 of the capsule 30, i.e. the surface facing the passageway 12.

Preferably, the heating elements 34 are PTC ceramic heaters. Such heaters, as is well known, exhibit inherent current limiting characteristics. Other types of heating elements, however, may alternatively be used.

Figure 6A:
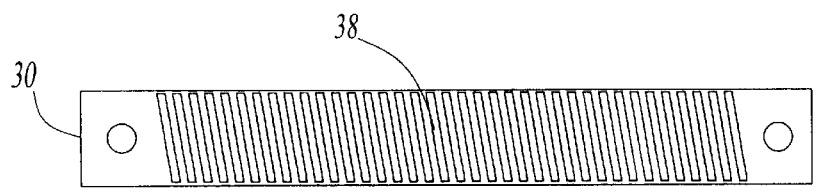
FIGS. 6A–6H are all plan views illustrating modifications of one side of one heating element.
Figure 6B:
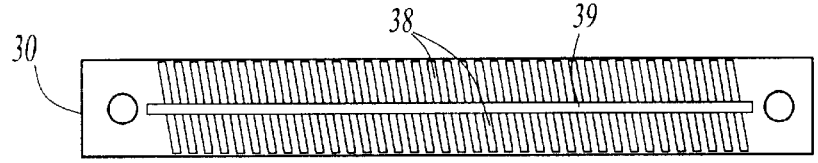
Figure 6C:
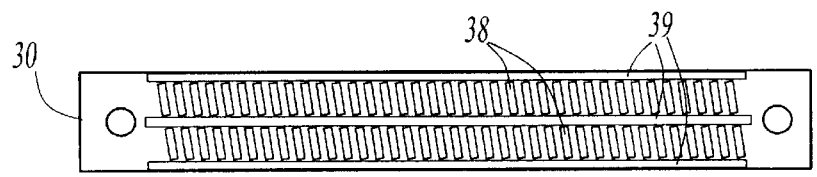
Figure 6D:
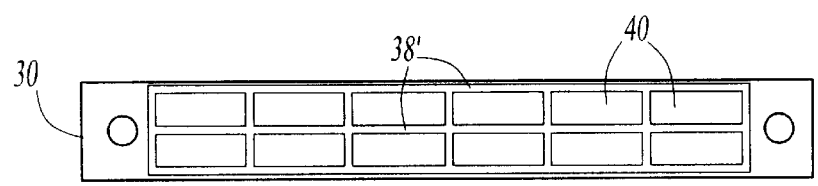
Figure 6E:
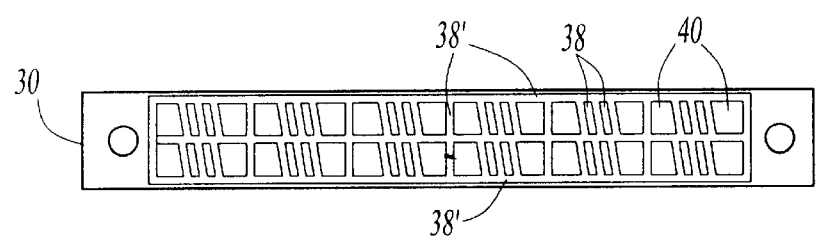
Figure 6F:
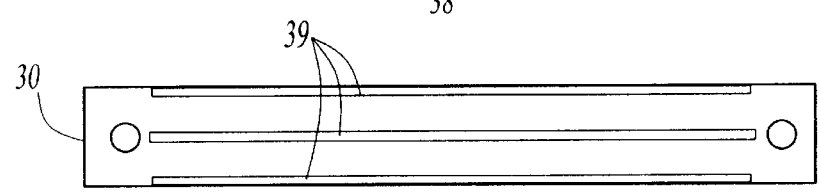

With reference to FIGS. 2 and 6A–6H, preferably a plurality of outwardly extending ribs 38 protrude outwardly from the inner surface 32 of each capsule 30. These ribs may take any of several configurations. For example, in FIGS. 6A–6C, the ribs 38 extend in a direction transverse, but slightly skewed, with respect to the air/fuel flow through the passageway 12. As shown in FIGS. 6B and 6C, one or more longitudinally extending strengthening ribs 39 are optionally provided along the capsule surface 32. Alternatively, as shown in FIGS. 6D and 6E, the ribs 38' extend both longitudinally and transversely across the capsule 30 thus forming a plurality of recesses 40 along the side 32 of the capsule 30. As shown in FIG. 6F, the capsule 30 may also include only the longitudinally extending ribs 39 without the transverse ribs 38.

Figure 6G:
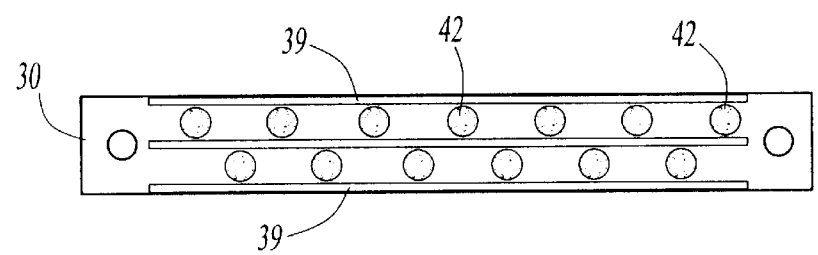
Figure 6H:
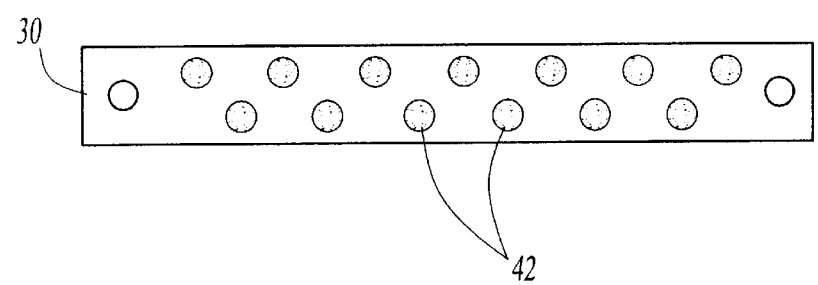

With reference now to FIGS. 6G and 6H, in lieu of the transverse ribs 38, the capsule 30 may include outwardly protruding nodes 42 which protrude inwardly into the passageway 12 at spaced intervals along the capsule 30. Additionally, the nodes 42 may be used in connection with the longitudinal strengthening ribs 39 as shown in FIG. 6G.

The ribs 38, 38', 39 and nodes 42 generally serve two different purposes. First, the ribs 38, 38', 39 and nodes 42 strengthen the capsule 30 and thus enable the remainder of the capsule 30 to be very thin to enhance the thermal conductivity from the heating elements 34. Secondly, the ribs 38, 38', recesses 40 and nodes 42 serve to collect or pool fuel droplets along the side 32 of the capsule 30 to prolong the contact of the fuel droplets with the capsule 30. This prolonged contact between the fuel droplets and the capsule 30 further ensures complete vaporization of the fuel prior to induction of the air/fuel mixture into the engine.

With reference now to FIGS. 2, 4 and 5, one side of each heating element 34 is both electrically and thermally connected to the capsule 30 which is typically maintained at ground. In order to provide the electrical connection to the opposite side 50 of each heating element 34, each heating element includes an elongated electrode 46 which overlies each of the heating elements 34 in each capsule 30. A spring 48, preferably constructed of spring metal, is disposed between the electrode 46 and each heating element 34 which electrically connects the side 50 of the heating element 34 to the electrode 46.

As best shown in FIG. 2, at least one, and preferably both ends 52 of the electrode 46 protrude outwardly through openings 54 formed in the support tube 20. These ends 52 of the electrode 46 are then electrically connected, preferably by soldering, to a positive electrode 58 disposed around the entire outer periphery of the support tube 20. This positive electrode 58 also includes through openings 60 which register with the openings 54 at one end of the support tube 20. The ends 52 of the electrode 46 are bent over on top or the outer periphery of the electrode 58 prior to electrically connecting the ends 52 of the electrode 46 to the positive electrode 58.

Referring again to FIGS. 2, 4 and 5, in order to electrically insulate the electrodes 46 and positive electrode 58 from the support tube 24, an electrical insulator 62, preferably made of plastic, is sandwiched in between the electrode 46 and the support tube 20. Similarly, an electrical insulator 64 (FIG. 2) is disposed between the positive electrode 58 and the outer periphery of the support tube 20 thereby electrically isolating the electrode 46 from the capsule 30 as well as the support tube 20. If the support housing 20 is made of an electrically nonconductive material, the insulator 64 may be omitted. A fluid gasket 66 is also preferably sandwiched in between the outer periphery of the capsule 30 and the support tube 20. This gasket 66 fluidly seals the interior of the capsule 30, and thus the heating elements 34, from fuel in the passageway 12. The gasket 66, however, does not electrically isolate the capsule 30 from the housing 20. Rather, an electrical connection is provided between the capsule 30 and the support tube 20 by the means for securing the capsule 30 to the support tube 20, such as the metal fasteners 70 in FIG. 2.

Other means may alternatively be utilized to electrically insulate the electrode 46 from the support tube 20. For example, as shown in FIG. 7, a piece of electrical insulating material 72, such as shrink tubing, may be provided around each end 52 of the electrode 46 so that the insulating material 72 is positioned in between the electrode 46 and the support tube 20. Alternatively, the support tube 20 may be anodized to electrically isolate the support tube 20 from the electrode 46 as well as from the positive electrode 58.

Figure 11A:
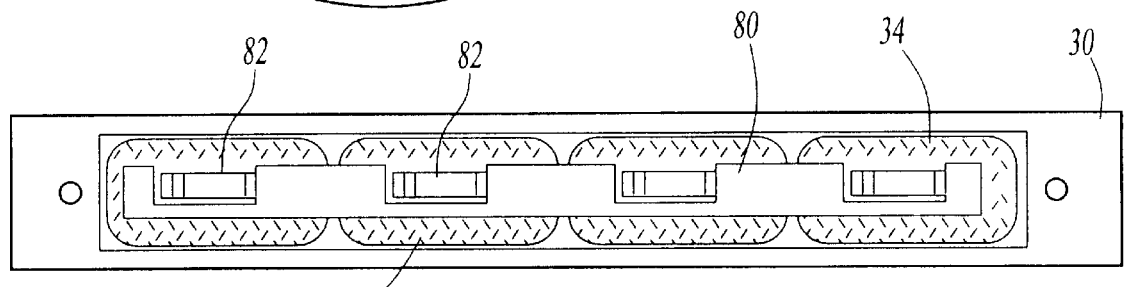
FIG. 11A is a plan view illustrating a modification of an electrode of the present invention.
Figure 11B:
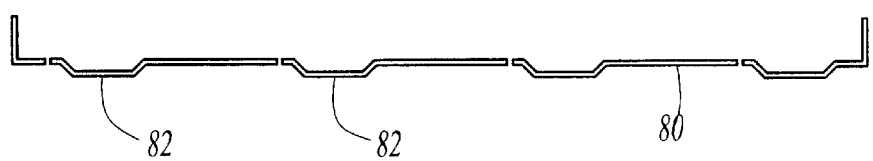
FIG. 11B is a side view of the electrode of FIG. 11A.
Figure 11C:
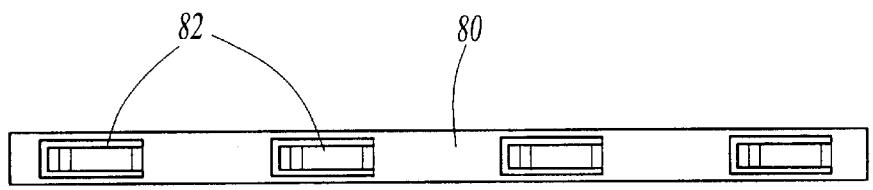
FIG. 11C is a plan view of a further modification of an electrode of the heater of the present invention.

Although individual springs 48 are preferably sandwiched in between the electrode 46 and the heating elements 34, alternatively, as best shown in FIGS. 11A and 11B, a spring strip 80 may be used in lieu of the separate springs 48. This spring strip 80 is constructed from a metal, preferably spring metal, and includes a plurality of outwardly protruding stampings 82 at spaced intervals along the spring strip 80. These stampings 82 protrude outwardly from the main body of the spring strip 80 and are spaced so that one stamping 82 is aligned with each heating element 34. These stampings 82 may be either wholly contained between the sides of the strip 80, as shown in FIG. 11C, or alternatively may be open to one side of the spring strip 80, as shown in FIG. 11A.

Any conventional means may be used to secure the capsule 30 to the support tube 20. For example, as shown in FIG. 2, the threaded fasteners 70 at opposite ends of the capsule 30 are used to directly secure the capsule 30 to the support tube 20. The fasteners 70 also form the electrical connection between the capsule 30 and the support tube 20.

Alternatively, as shown in FIGS. 8 and 9, a pair of longitudinally extending guide rails 90 are secured to the support tube 20 in any conventional fashion so that the guide rails 90 form channels which face each other. The guide rails 90, furthermore, are spaced apart by a distance substantially the same as the width of the capsule 30 so that the capsule 30 may be slid into the support tube 20 in between facing guide rails 90 thus securing the capsules 30 to the support tube 20.

Figure 10:
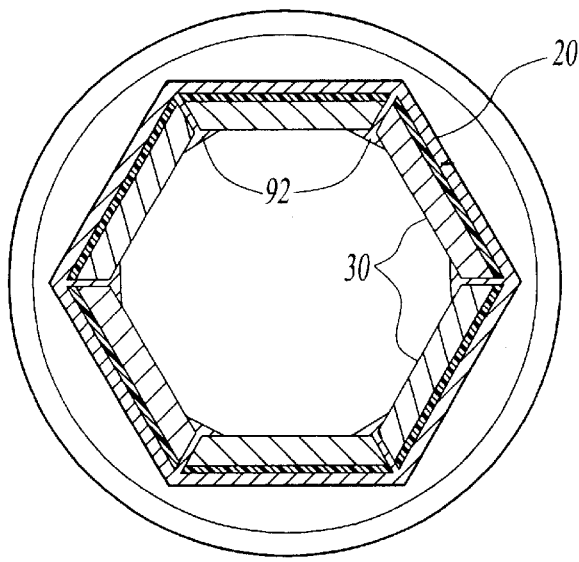
FIG. 10 is a view similar to FIG. 9 but illustrating a further modification thereof.

Similarly, with reference now to FIG. 10, the guide rails 90 may be replaced by a generally T-shaped longitudinally extending beam 92 secured to the support tube 20. The beam 92 is dimensioned to support one side of a capsule 30 on each of its two lateral sides.

Figure 13:
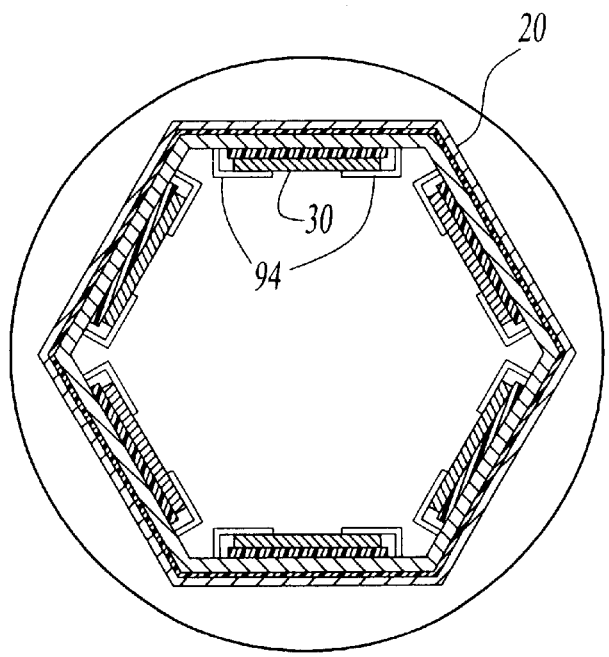
FIG. 13 is a longitudinal sectional view illustrating a further modification for mounting the heating assemblies to the support housing.

Similarly, as shown in FIG. 13, locking flanges 94 may be used to support and secure the opposite ends of the capsule 30 to the support tube 20.

Figure 12:
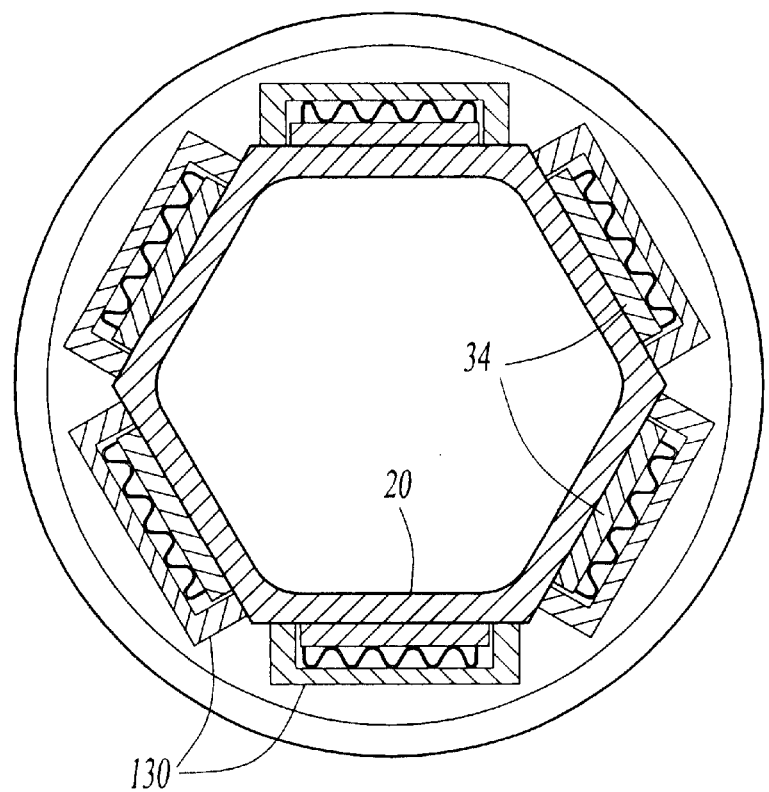
FIG. 12 is a cross-sectional view illustrating a further embodiment of the present invention.

As thus far described, the capsules 30 have all been positioned on the inside of the support tube 20. However, with reference now to FIG. 12, in an alternative embodiment of the invention, a plurality of circumferentially spaced capsules 130 are positioned on an exterior surface of the support tube 20. The heating elements 34 are then sandwiched in between the capsules 130 and the support tube 20 so that the heating elements 34 heat the support tube 20 thus vaporizing fuel in the passageway 12. Appropriate electrodes, gaskets, and electrodes are utilized to provide power to the heating elements 34 in a fashion to that previously described.

From the foregoing, it can be seen that the present invention provides a simple, inexpensive, and yet highly effective heater for vaporizing fuel in an air/fuel passageway. Although the present invention is particularly advantageous for use as a heater for a cold start fuel injector, it may alternatively be used on other types of air/fuel passageways.

Having described our invention, however, many modifications thereto will become apparent to those skilled in the art to which it pertains without deviation from the spirit of the invention as defined by the scope of the appended claims.

We claim:

1. For use in connection with a fuel passageway in an internal combustion engine in which fuel is injected into the passageway, a heater comprising:

a tubular housing insertable into the passageway, a plurality of heating assemblies, each heating assembly having a capsule and at least one electrical heating element thermally coupled to its associated capsule, means for securing said capsules to said housing so that said capsules are circumferentially spaced from each other and so that at least one surface of each capsule is open to said passageway.

2. The invention as defined in claim 1 wherein each capsule includes a plurality of ribs which extend outwardly from said at least one surface.

3. The invention as defined in claim 2 wherein said capsule is elongated and wherein said ribs each have an axis oblique with respect to an axis of said capsule.

4. The invention as defined in claim 2 wherein said capsule is elongated and wherein at least one of said ribs extends perpendicularly with respect to an axis of said capsule.

5. The invention as defined in claim 2 wherein said ribs are generally circular in shape.

6. The invention as defined in claim 1 wherein said heating element comprises a PTC heating element.

7. The invention as defined in claim 1 and comprising a plurality of heating elements associated with each capsule.

8. The invention as defined in claim 1 wherein said capsule is constructed of metal.

9. The invention as defined in claim 1 wherein said capsule forms one electrode, said heating element having one side in contact with said capsule and comprising a second electrode positioned in said capsule so that said second electrode overlies said heating element, and an electrically conductive spring sandwiched in between said second electrode and said heating element.

10. The invention as defined in claim 9 wherein said spring comprises a strip of spring metal having at least one offset projection.

11. The invention as defined in claim 9 wherein a pair of spaced openings are formed through the housing for each capsule and wherein opposite ends of said second capsule extend through said openings.

12. The invention as defined in claim 1 and comprising a fluid gasket sandwiched between said capsule and said housing.

13. The invention as defined in claim 1 wherein said means for securing said capsule to said housing comprises a plurality of pairs of spaced and parallel rails secured to said housing, each said pair of rails adapted to engage and support opposite sides of one capsule.

14. The invention as defined in claim 1 wherein said means for securing said capsule to said housing comprises a threaded fastener extending through said capsule and threadably engaging said housing.

15. The invention as defined in claim 1 wherein said means for securing said capsule to said housing comprises a plurality of pairs of spaced and parallel rails secured to said housing, each said pair of rails adapted to engage and support opposite ends of one capsule.

16. For use in conjunction with a fuel passageway in an internal combustion engine in which fuel is injected into the passageway, a heater comprising:

a tubular housing insertable into the passageway, said housing having an inner surface open to the passageway and an outer surface, a plurality of heater assemblies, each heating assembly having a capsule and at least one electrical heating element, means for securing said capsules to said outer surface of said housing so that said capsules are circumferentially spaced from each other and so that at least one surface of each heating element in each capsule is thermally connected with said outer surface of said housing.

17. The invention as defined in claim 16 wherein said heating elements are in physical contact with said outer surface of said housing.

18. The invention as defined in claim 16 and comprising an electrical insulator gasket sandwiched between each capsule and the housing, and an electrical electrode extending circumferentially around one end of said housing, and means for electrically connecting said electrode to each capsule.

19. The invention as defined in claim 16 and comprising an electrode associated with each capsule, one end of each electrode extending outwardly through an opening in said capsule, an electrical insulator strip sandwiched between each electrode and said capsule, and means for electrically connecting said electrode to said heating element.

20. The invention as defined in claim 19 wherein said electrical connecting means comprises a metal spring.

21. The invention as defined in claim 20 wherein said metal spring comprises a strip of spring metal.

22. For use in connection with a fuel passageway in an internal combustion engine in which fuel is injected into the passageway, a heater comprising:

a tubular housing insertable into the passageway, a plurality of heating assemblies, each heating assembly having a capsule and at least one electrical heating element thermally coupled to its associated capsule, said capsules being secured to said housing so that said capsules are circumferentially spaced from each other and so that at least one surface of each capsule is open to said passageway.

23. For use in conjunction with a fuel passageway in an internal combustion engine in which fuel is injected into the passageway, a heater comprising:

a tubular housing insertable into the passageway, said housing having an inner surface open to the passageway and an outer surface, a plurality of heater assemblies, each heating assembly having a capsule and at least one electrical heating element, said capsules being secured to said outer surface of said housing so that said capsules are circumferentially spaced from each other and so that at least one surface of each heating element in each capsule is thermally connected with said outer surface of said housing.

* * * * *